Figure 1:
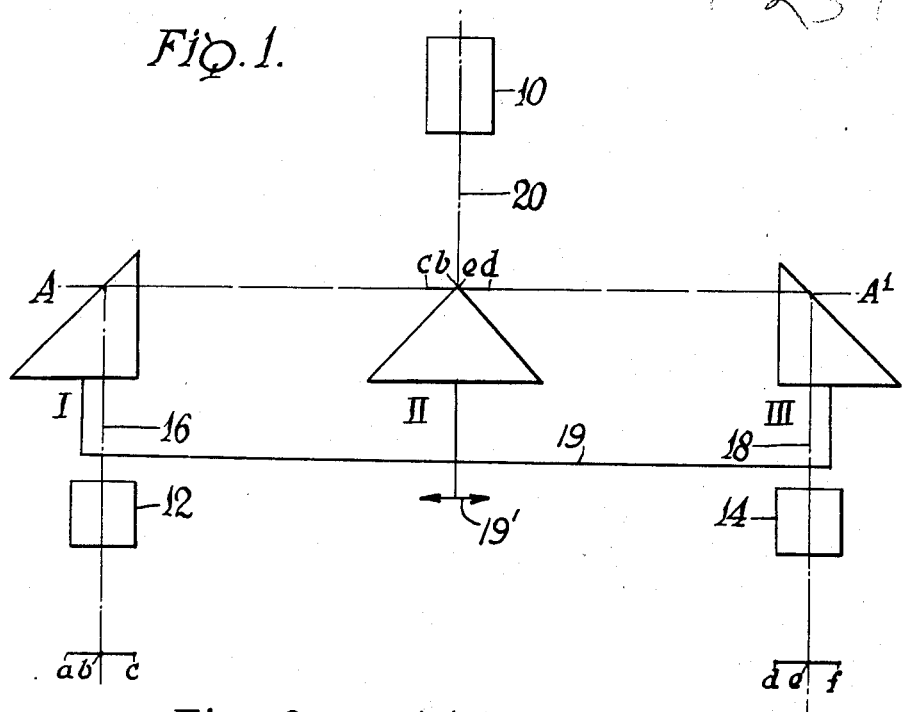

Nov. 23, 1965   J. E. ARMINGTON   3,218,908
ADJUSTABLE OPTICAL PRISM FIELD SPLITTER
Filed March 1, 1961

INVENTOR.
James E. Armington
BY
Bean, Brooks, Buckley & Bean
ATTORNEYS.

United States Patent Office 3,218,908
Patented Nov. 23, 1965

3,218,908
ADJUSTABLE OPTICAL PRISM FIELD SPLITTER
James E. Armington, Buffalo, N.Y., assignor to American Optical Company, Southbridge, Mass.
Filed Mar. 1, 1961, Ser. No. 92,542
3 Claims. (Cl. 88—1)

This invention relates to optical viewing systems wherein two separate objects are viewed simultaneously and wherein the invention resides in the provision for adjusting the portion of the field of the viewing instrument occupied by the images of the two objects.

In optical viewing systems wherein two objectives are used in conjunction with a viewing instrument to produce side-by-side images of separate objects in the focal plane of the viewing instrument, it is frequently desirable to vary the portion of the field of the viewing instrument occupied by the images of the two objects. It is of primary concern in connection with the present invention to obtain such adjustment by relatively simple means.

More specifically, it is a primary object of the present invention to provide a combination of a pair of objectives, a viewing instrument and a prism unit for bringing the images produced by the objectives into the focal plane of the viewing instrument wherein the prism system is so constructed and arranged that a simple translational movement thereof will effect variation of the portion of the field of the viewing instrument occupied by the images of the two objects upon which the objectives are focused.

A further object of this invention is to provide an optical system including a pair of objectives, each to be focused upon an object, and wherein each of these objectives has associated therewith an objective prism, the two objectives being spaced apart and there being a third prism between the objective prisms which reflects the images produced by the objectives into side-by-side relation in the focal plane of the viewing instrument and wherein the prism system is such that when the third prism has its apex aligned with the optical axis of the viewing instrument, each objective prism will reflect the principal ray, that is the ray along the optical axis of the respective objective, at the apex of the third prism, the three prisms being movable as a unit along a path at right angles to the optical axis of the viewing instrument whereby to variably adjust the portions of the field of the viewing instrument occupied by the images of the two objectives.

A further object of this invention is to provide an improved optical system wherein a pair of objectives are utilized to focus independently upon separate objects and wherein a prism unit is associated with these objectives and with a viewing instrument for reflecting the images produced by the objectives in the focal plane of the viewing instrument and wherein in one position of the prism unit, approximately half the field of each of the objectives is placed in the focal plane of the viewing instrument, the two objective images thus obtained being disposed in side-by-side relationship and occupying substantially the full field of the viewing instrument and wherein the prism unit is translated as a single unit back and forth to vary the portion of the field occupied by the images from the two objectives such that the system is adjustable between two extremes, one in which the focal plane of the viewing instrument is occupied substantially solely by the image of the field of one of the objectives and in the opposite position wherein the field of the viewing instrument is occupied substantially solely by the image of the field of the other objective.

Figure 2:
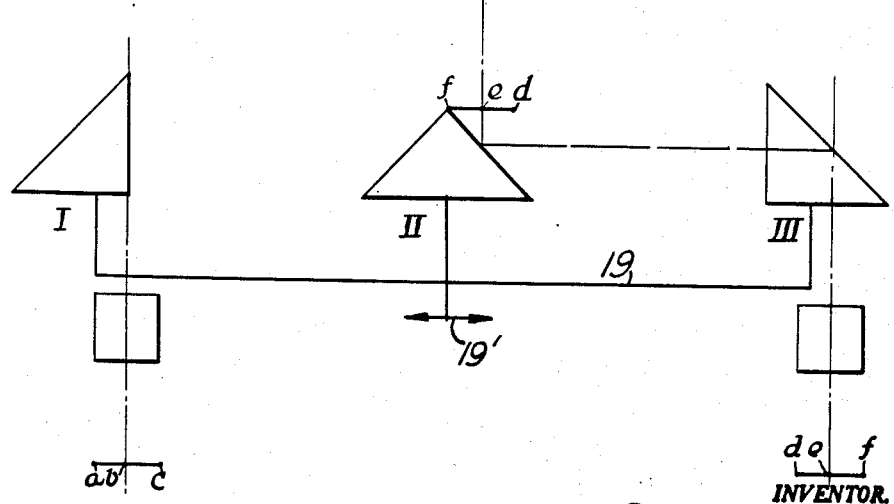

In the drawing FIG. 1 is a diagrammatic view of an optical system in accordance with the present invention and illustrating the prism unit in its central position wherein one-half of the field of the viewing instrument is occupied by an image produced by one of the objectives and the other half of the field of the viewing instrument is occupied by an image produced by the other objective;

FIG. 2 is a view similar to FIG. 1 but showing the prism unit translated to one side of the central position as shown in FIG. 1 and illustrating the fashion in which the field of the viewing instrument is occupied solely by the image of the field of only one of the objectives.

The system according to FIG. 1 includes a viewing instrument 10, and a pair of objectives 12 and 14, all of which may be formed in any conventional manner and the details of which form no part of the present invention. It will be noted that the optical axis of the objective 12, indicated by the reference character 16, is substantially parallel to the optical axis 18 of the objective 14 and that likewise the optical axis 20 of the viewing instrument 10 is disposed in parallelism between the two optical axes 16 and 18. The respective objectives 12 and 14 have associated therewith the prisms I and III which are similarly formed and which are adapted to reflect the rays of light passing through the two objectives toward the intermediately disposed prism II.

It will be noted that the prisms I, II and III are rigidly affixed together by any suitable means, such as is indicated by the interconnecting lines 19, for translational movements in unison along the axis A–A', as indicated by the double-arrow line 19', which will be seen to be at right angles to the several optical axes 16, 18 and 20. Furthermore, it will be noted that the apex of the prism II lies on the axis A–A'.

As shown in FIG. 1, the points $a$, $b$ and $c$ define the field of objective 12, the point $b$ being the center of the field with $a$ and $c$ being the outer extremities of the field. Likewise, the points $d$, $e$ and $f$ in association with the objective 14 define the limits of the field of this objective. The focal plane of the viewing instrument 10 lies in a plane containing the apex of prism II and it will be noted that while the prisms are in a position relative to the objectives and the viewing instrument as is shown in FIG. 1, one-half of the field of the viewing instrument 10 will be occupied by the image of that portion of the field $b$, $c$ of the objective 12 and the other half of the field of the viewing instrument 10 will be occupied by the image of field portion $d$, $e$ of the objective 14.

Now referring to FIG. 2, it will be noted that the prism unit I, II and III has been shifted to the left along the axis A–A', in which case the image of the entire field $d$, $e$ and $f$ of the objective 14 occupies the field of the viewing instrument 10. It will be understood that the prism assembly is moveable between this extreme and the opposite extreme wherein the field image of objective 12 occupies the entire field of the viewing instrument. However, it will also be understood that these extremities of prism unit movement need not necessarily prevail since the principle involved concerns the simple manner in which the areas of the field of the viewing instrument occupied by the object images may be varied.

I claim:
1. In an optical system including a viewing instrument and a pair of objectives for focusing the images of separate objects in side-by-side relation in the focal plane of the viewing instrument, a prism unit for varying the portion of the field of the viewing instrument occupied by the images of the separate objects, said unit comprising a prism associated with each objective and a prism associated with said viewing instrument, said prisms being movable, as a unit, along a path normal to the optical axis of said viewing instrument, and the last prism having its apex at the focal plane of the viewing instrument.

2. In an optical system, a pair of objectives having their optical axes disposed in spaced parallelism, a prism associated with each objective, a further prism disposed between the first prisms, said prisms being so related to each other as to produce images of separate objects upon which the objectives are focused in side-by-side relation in a common plane lying substantially at the apex of the said further prism, said prisms being movable, as a unit, along a path parallel to the image plane, and a viewing instrument having its focal plane coincident with said image plane whereby movement of the prism unit will vary the portion of the field of the viewing instrument occupied by the images of said objects.

3. In an optical system, a three-prism assembly comprising a pair of objective prisms and an intermediate prism, all fixed relative to each other and being movable as a unit along a predetermined path, said prisms being so related as to place images of separate objects in a common image plane in a side-by-side relation, and the predetermined path of movement of said prism assembly being parallel to said image plane, each objective prism having an objective associated therewith and each objective having a predetermined field, a viewing instrument having its focal plane coincident with said image plane, said prism assembly being movable between two positional extremes, one in which the entire field of the viewing instrument is occupied by the field image of one objective and the other in which the entire field of the viewing instrument is occupied by the field image of the other objective.

References Cited by the Examiner

UNITED STATES PATENTS

| | | | |
|---|---|---|---|
| 1,259,775 | 3/1918 | Prucha et al. | 88—16.6 |
| 1,307,074 | 6/1919 | Baruch | 88—16.6 |
| 1,438,906 | 12/1922 | Douglass | 88—1 X |
| 1,564,418 | 12/1925 | Konig. | |
| 1,849,607 | 3/1932 | Bernheim | 88—14 |
| 2,040,066 | 5/1936 | Ursinus. | |

DAVID H. RUBIN, *Primary Examiner.*

EMIL G. ANDERSON, JEWELL H. PEDERSEN,
*Examiners.*

WILLIAM T. SKEER, JOHN K. CORBIN,
*Assistant Examiners.*